US011008457B2

(12) United States Patent
Naito et al.

(10) Patent No.: US 11,008,457 B2
(45) Date of Patent: May 18, 2021

(54) FILM COMPOSITION CONTAINING A TANNIC ACID DERIVATIVE AND PROCESS FOR PRODUCING SAID FILM COMPOSITION

(71) Applicant: NATIONAL INSTITUTE FOR MATERIALS SCIENCE, Tsukuba (JP)

(72) Inventors: Masanobu Naito, Tsukuba (JP); Joginder Bansal, Tsukuba (JP); Debabrata Payra, Tsukuba (JP)

(73) Assignee: NATIONAL INSTITUTE FOR MATERIALS SCIENCE, Tsukuba (JP)

( * ) Notice: Subject to any disclaimer, the term of this patent is extended or adjusted under 35 U.S.C. 154(b) by 75 days.

(21) Appl. No.: 16/303,487

(22) PCT Filed: May 26, 2017

(86) PCT No.: PCT/JP2017/019811
§ 371 (c)(1),
(2) Date: Nov. 20, 2018

(87) PCT Pub. No.: WO2017/204359
PCT Pub. Date: Nov. 30, 2017

(65) Prior Publication Data
US 2020/0024447 A1 Jan. 23, 2020

(30) Foreign Application Priority Data
May 27, 2016 (JP) .............................. JP2016-106822

(51) Int. Cl.
C08L 75/04 (2006.01)
C08G 18/10 (2006.01)
(Continued)

(52) U.S. Cl.
CPC .............. C08L 75/04 (2013.01); C08G 18/10 (2013.01); C08G 18/3206 (2013.01);
(Continued)

(58) Field of Classification Search
CPC ............................ C08G 18/10; C08G 18/6492
See application file for complete search history.

(56) References Cited

U.S. PATENT DOCUMENTS 3,577,358 A * 5/1971 Santelli .................. C08G 18/30
521/151
2008/0262613 A1* 10/2008 Gogolewski ....... C08G 18/3203
623/11.11
(Continued)

FOREIGN PATENT DOCUMENTS

CN 105924616 A * 9/2016
GB 1438300 A * 6/1976 ............. C09D 5/086
(Continued)

OTHER PUBLICATIONS

Thebault et al. Isocyanate free condensed tannin-based polyurethanes. European Polymer Journal 67 (2015) 513-526. http://dx.doi.org/10.1016/j.eurpolymj.2014.10.022 (Year: 2015).*
(Continued)

Primary Examiner — Michael M Dollinger
(74) Attorney, Agent, or Firm — Manabu Kanesaka

(57) ABSTRACT

A self-supporting multifunctional film is provided based on natural poly-phenols such as tannic acid. The self-supporting film composition of the invention contains a tannic acid derivative in which 12% to 24% of hydroxyl groups in tannic acid are bonded via urethane bonds that are formed by way of reactions with cyanate groups. Preferably, the film composition further includes a precursor polymer and 45 to 65% by mass of tannic acid and 55 to 35% by mass of the precursor polymer. Preferably, the precursor polymer has a second linear hydrocarbon compound urethane-bonded to both ends of a first linear hydrocarbon compound, and more preferably a diisocyanate group having an oligoethyene glycol as a spacer. Preferably, the ratio of the urethane bonds
(Continued)

contained in the precursor polymer to the hydroxyl groups contained in the tannic acid is (12:88) to (24:76) inclusive in terms of molar ratio.

9 Claims, 11 Drawing Sheets

(51) Int. Cl.
    *C08G 18/32*     (2006.01)
    *C08G 18/42*     (2006.01)
    *C08G 18/64*     (2006.01)
    *C08G 18/73*     (2006.01)
    *C08J 5/18*     (2006.01)
    *C08J 7/12*     (2006.01)
    *C08L 99/00*     (2006.01)

(52) U.S. Cl.
    CPC ......... *C08G 18/4286* (2013.01); *C08G 18/64* (2013.01); *C08G 18/73* (2013.01); *C08J 5/18* (2013.01); *C08J 7/12* (2013.01); *C08L 99/00* (2013.01); *C08L 2203/02* (2013.01); *C08L 2203/16* (2013.01)

(56) References Cited

U.S. PATENT DOCUMENTS

2012/0123043 A1*   5/2012   Nakamura ......... C08G 18/4854
                                                 524/507
2015/0361240 A1*  12/2015   Pizzi ................. C08G 18/6492
                                                  521/56
2016/0208044 A1*   7/2016   Mukerjee ........... C08G 18/3206

FOREIGN PATENT DOCUMENTS

| GB | 1438300 A | 6/1976 |
|---|---|---|
| JP | S58-040372 A | 3/1983 |
| JP | 2004-307362 A | 11/2004 |
| JP | 2015-113411 A | 6/2015 |
| JP | 2017-019238 A | 1/2017 |
| WO | 2016/076311 A1 | 5/2016 |

OTHER PUBLICATIONS

Machine Translation of JP 2015113411 (Year: 2020).*
PCT/ISA/210, "International Search Report for International Application No. PCT/JP2017/019811," dated Aug. 8, 2017.
Susana B. Grassino et al, Photoactive films obtained from methacrylourethanes tannic acid-based with potential usage as coating materials: analytic and kinetic studies, Prog Org Coating, Nov. 1999, vol. 37, No. 1/2, pp. 39-48, ISSN: 0300-9440.
Satyabrat Gogoi et al, Bio-based high-perfgormance waterborne hyperbranched polyurethane thermoset, polym Adv Technol, Jun. 2015, vol. 26, No. 6, pp. 589-596, ISSN: 1042-7147.
Europe Patent Office, "Search Report for European Patent Publication No. 17802945.0," dated Sep. 25, 2019.
Grassino, S. B. et al., "Photoactive films obtained from methacrylourethanes tannic acid-based with potential usage as coating materials: analytic and kinetic studies," Progress in Organic Coatings, Nov. 1, 1999, p. 39-48, vol. 37, No. 1/2, Elsevier Science S.A., ISSN: 0300-9440.

* cited by examiner

A0   A1   A2

FIG.10(A)
SEM
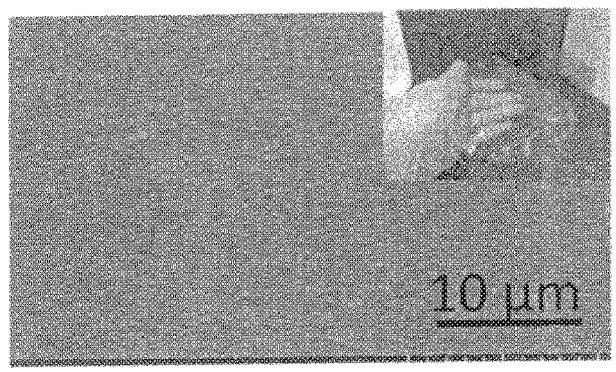
FIG.10(B)
AFM
FIG.11(A)
FIG.11(B)
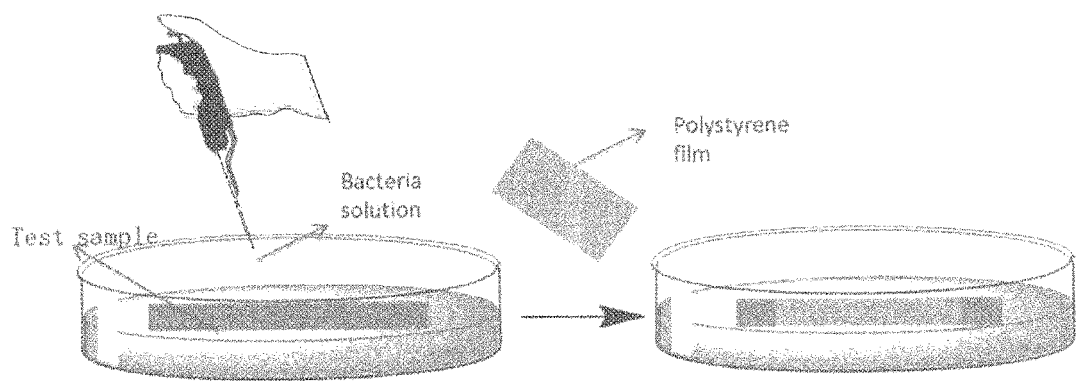
FIG.12
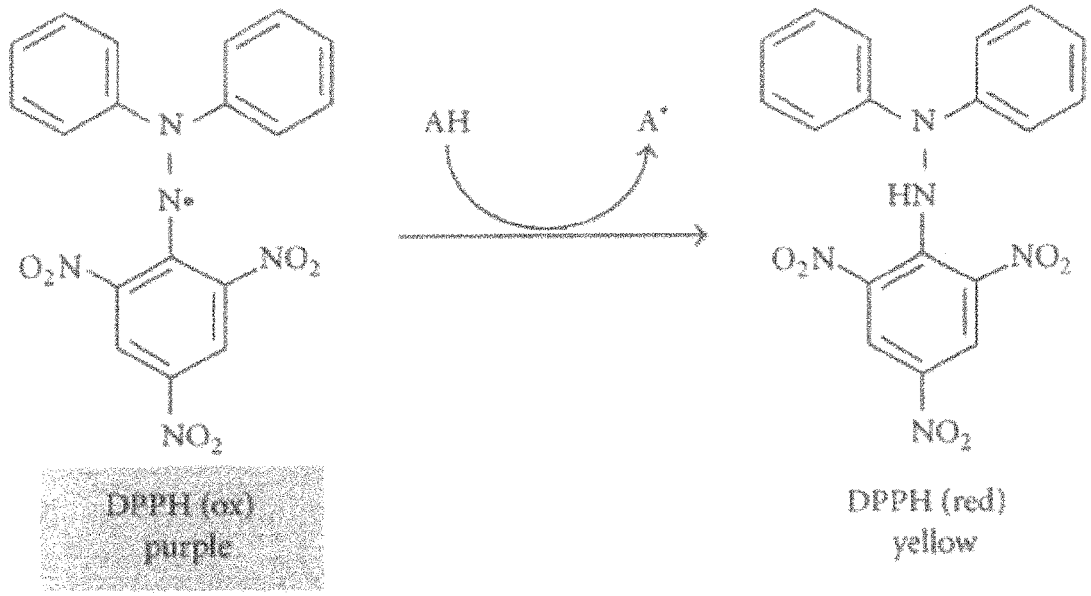

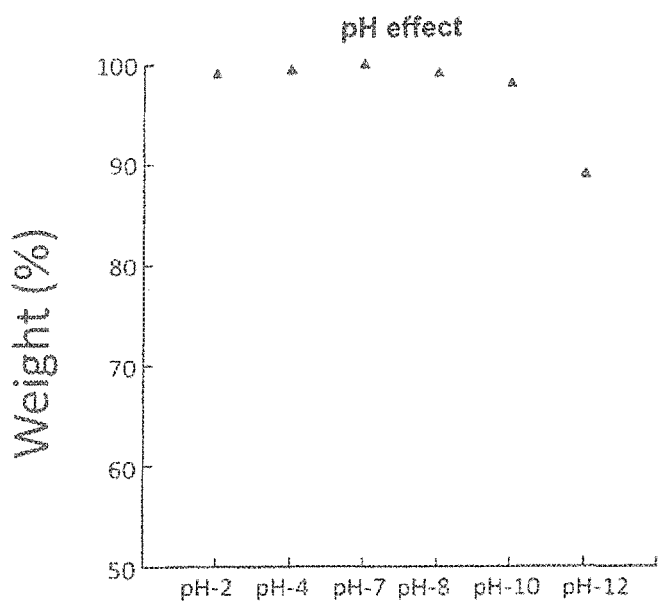
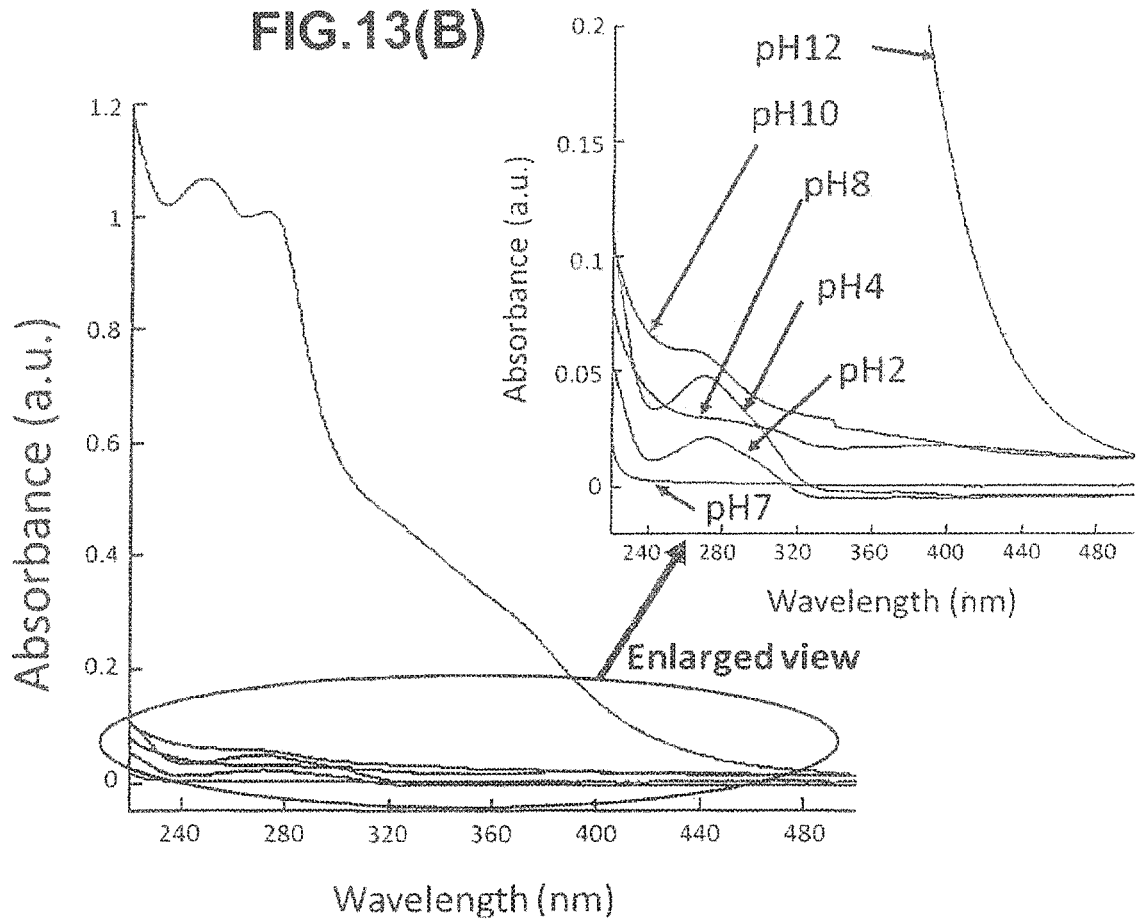

FILM COMPOSITION CONTAINING A TANNIC ACID DERIVATIVE AND PROCESS FOR PRODUCING SAID FILM COMPOSITION

RELATED APPLICATIONS

The present application is National Phase of International Application No. PCT/JP2017/019811 filed May 26, 2017, and claims priority from Japanese Application No. 2016-106822, filed May 27, 2016, the disclosure of which is hereby incorporated by reference herein in its entirety.

ART FIELD

The present invention relates generally to a film composition containing a tannic acid derivative, and more particularly to a composition that is preferable for use with films having superior antibacterial, sterilizing, bactericidal and like activities.

BACKGROUND ART

Tannin is a general term for astringent plant ingredients which are widely found in the plant kingdom and yield polyhydric phenols (polyphenols) by way of hydrolysis, and generally broken down into two lines having fundamentally different chemical structures: hydrolysable tannin and condensed tannin.

However, tannin has limited applications because of being hardly soluble in organic solvents. As well known in the art, this may be solved by substituting at least some of hydroxyl groups contained in the tannin molecules with alkyl ethers or alkyl esters to obtain water-insoluble tannic acid derivatives (see Patent Publication 1).

The Applicant has already come up with a coating material containing tannic acid derivatives (see Patent Publication 2). Tannic acid is found to have significant effects well suited for the food industry, the sporting goods industry and so on wherein antibacterial activity, sterilizing activity, bactericidal activity and so on are required.

PRIOR ARTS

Patent Publications

Patent Publication: JP(A) 2004-307362
Patent Publication 2: WO 2016-076311

SUMMARY OF THE INVENTION

Problems with the Prior Art

However, the coating material containing a tannic acid derivative has been less used in the food industry or the sporting goods industry because there must be its raw material available. In other words, it is required to coat the starting material with a tannic acid derivative-containing solution to form a coating film; much has still been left to be desired in terms of ease of use.

If there is a tannic acid derivative-containing film available, it is then unnecessary to distribute that film integrally with the raw material, leading to advantageous storage or transportation and an increased commonness to the medium covered with a film.

To solve the aforesaid problem, the present invention has for its object to provide a self-supporting, multifunctional film based on naturally occurring poly-phenols such as tannic acid.

EMBODIMENTS OF THE INVENTION

The self-supporting film composition of the invention contains a tannic acid derivative wherein 12% to 24% of hydroxyl groups in tannic acid are bonded via urethane bonds that are formed by way of reactions with a linear precursor polymer that has isocyanate groups at both of its ends groups.

Preferably, the self-supporting film composition of the invention, the tannic acid derivative includes 45 to 65% by mass of tannic acid and 55 to 35% by mass of the precursor polymer.

In the self-supporting film composition of the invention, the linear precursor polymer is preferably that a second linear hydrocarbon compound having hydroxyl groups at both of its ends is urethane-bonded to a first linear hydrocarbon compound having isocyanate groups at both of its ends. More preferably, the second linear hydrocarbon compound is an oligoethylene glycol as a spacer and the first linear hydrocarbon compound is a hexamethylene diisocyanate.

In the self-supporting film composition of the invention, a ratio of the isocyanate groups contained in the linear precursor polymer to the hydroxyl groups contained in the tannic acid is preferably (12:88) to (24:76) inclusive in terms of molar ratio.

In the self-supporting film composition of the invention, the tannic acid preferably takes a form of being dissolved in a solution containing dehydrated tetrahydrofuran.

The self-supporting film composition of the invention preferably provides a disinfectant, bactericidal, sterilizing, antibacterial or antioxidant activity.

The present invention also provides a process for producing a self-supporting film composition, comprising:
a step of mingling a first linear hydrocarbon compound having isocyanate groups at both of its ends with a second linear hydrocarbon compound having hydroxyl groups at both of its ends for reactions to yield a precursor polymer in which the second linear hydrocarbon compound is urethane-bonded to the first linear hydrocarbon compound,
a step of mingling the precursor polymer with a tannic acid solution, and
a step of producing a film by the precursor polymer and tannic acid.

In the production process of the self-supporting film composition of the invention, the second linear hydrocarbon compound having hydroxyl groups at both of its ends is preferably an oligoethylene glycol having a molecular formula. H—(O—$CH_2$—$CH_2$)$_n$—OH wherein the number of repetitions, n, is 9 or more, or a polyethylene glycol having a number of repetitions, n, of 10 or more.

Preferably in the production process of the self-supporting film composition according to the invention, the first linear hydrocarbon compound having isocyanate groups at both of its ends is hexamethylene diisocyanate.

Preferably in the production process of the self-supporting film composition of the invention, the ratio of the isocyanate groups contained in the precursor polymer at both of its ends to the hydroxyl groups contained in the tannic acid is (12:88) to (24:76) inclusive in terms of molar ratio.

ADVANTAGES OF THE INVENTION

The self-supporting film composition according to the invention is capable of film formation, and allows for a tannic acid-containing film to provide a stable film by itself. A study of what mechanism involved in the formation of that film has just begun to take shape; however, it would be presumed that the tannic acid derivative molecules are lined up together with the linear hydrocarbon groups in alignment, and the second linear hydrocarbon compound is urethane-bonded to the first linear hydrocarbon compound of the precursor polymer, resulting in the formation of macromolecules. This could bring about film stabilization as well as various functions such as improved antibacterial and bactericidal functions.

BRIEF EXPLANATION OF THE DRAWINGS

FIGS. 10(A) and 10(B) are a (10-μm scale) SEM photograph and a (500-nm scale) atomic force microscope (AFM) photograph, respectively, taken of a film composition prepared as one example of the invention.

FIG. 11 is illustrative of the antibacterial test of a film composition prepared as one example of the invention.

FIG. 12 is illustrative of the free-radical capturing mechanism of DPPH (2,2-diphenyl-1-picrylhydrazyl).

FIG. 13 is illustrative of the pH-dependent degradation test of a film composition prepared as one example of the invention with (A) as pH and weight changes, and (B) as ultraviolet-visible spectroscopic spectra.

MODES FOR CARRYING OUT THE INVENTION

Figure 1:
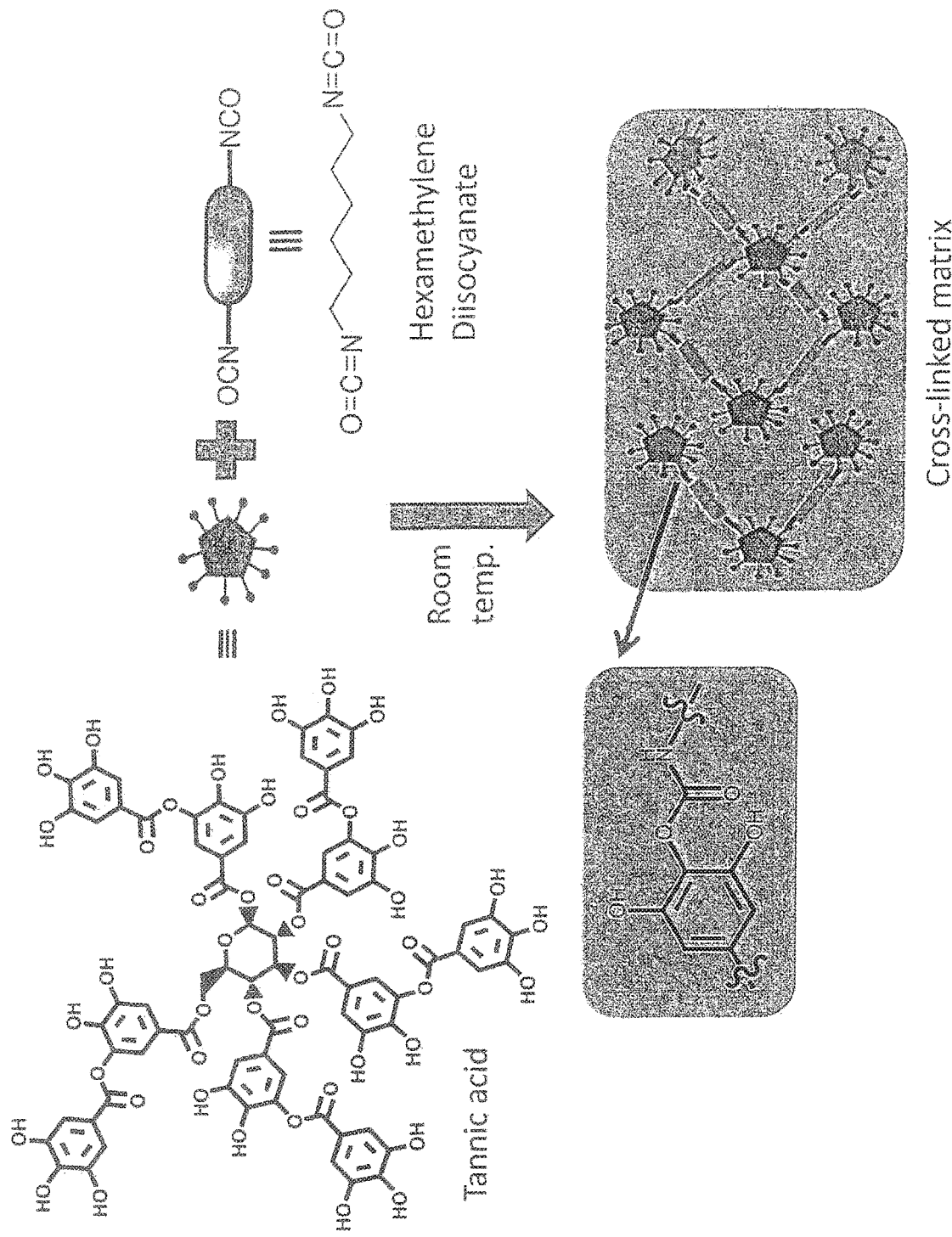
FIG. 1 is a chemical reaction process diagram illustrative of a comparative example of the invention, wherein tannic acid is synthesized in one step without recourse to any precursor polymer.

Tannin is a general name for plant ingredients that yield polyhydric phenols by way of hydrolysis, and generally broken down into two lines: hydrolysable tannin in which gallic or ellagic acid is ester-bonded to glucose or the like, and susceptible to hydrolysis with acids or enzymes, and condensed tannin in which a compound having a flavanol skeleton is polymerized. Even with either type of tannin or even with any tannin mixture, it is possible to achieve derivatization as referred to herein with such advantages as mentioned herein. Preference is given to the hydrolysable tannin. For instance, what is composed mainly of such tannic acid as represented by the following formula (1) may be derivatized. The tannic acid used in the examples to be given later is a natural product derived from the galls of *Rhus chinensis*, and it has been shown that it has sufficient bactericidal and antibacterial activities, although it may contain substances that are formed by cleavage or recombination of ester bonds of gallic or ellagic acid in extraction or purification processes.

Chemical Formula 1

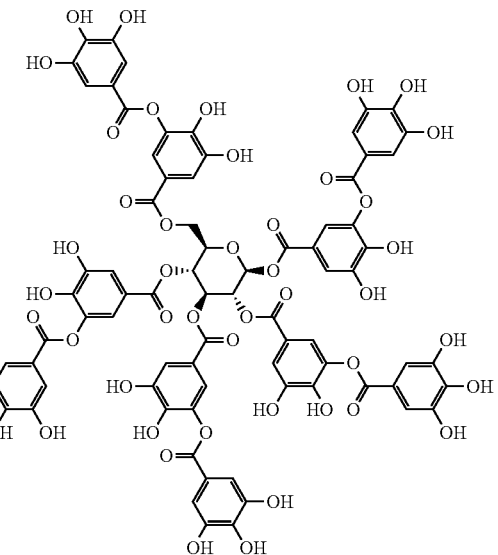

(1)

Tannic acid contains a plurality of hydroxyl groups in it, and in the derivative of the invention, hydrogen atoms in at least some of the hydroxyl groups are substituted by isocyanate groups. The total number of hydroxyl groups in the starting tannic acid differs depending on its type. Preferably, 12% to 24% inclusive of the hydroxyl groups are substituted, more preferably 15% to 24% inclusive substituted, and most preferably 15% to 20% inclusive substituted. Take the aforesaid formula (1) as an example. The total number of hydroxyl groups is 25, out of which preferably 3 to 6 inclusive, and more preferably 4 to 6 inclusive are substituted.

Preferably in the self-supporting film composition of the invention, the precursor polymer has the second linear hydrocarbon compound urethane-bonded to the first linear hydrocarbon compound.

Mingling of the first linear hydrocarbon compound having isocyanate groups at both of its ends with the second linear hydrocarbon compound having hydroxyl groups at both of its ends for reactions results in formation of the linear precursor polymer in which the second linear hydrocarbon compound having hydroxyl groups at both of its ends is urethane-bonded to the first linear hydrocarbon compound having isocyanate groups at both of its ends. The reaction temperature is preferably 25° C. to 100° C., and more preferably 70° C. to 80° C. Use of dibutyltin diacetate as a catalyst may lead to reactions without heating, yielding urethane bonds.

For the chain hydrocarbon groups of the linear hydrocarbon compound, there is the mention of a linear or branched alkyl, alkenyl or alkynyl group, which is bonded to a tannic acid skeleton via a bond containing an oxygen atom derived from the hydroxyl group. Specifically, the linear hydrocarbon group may include butyl, hexyl, heptyl, octyl, isooctyl, nonyl, isononyl, decyl, undecyl, dodecyl, hexadecyl, propylene, hexylene, hexadecenyl and octa-decenyl groups. The number of carbon atoms is preferably 4 to 18, and more preferably 6 to 16. For instance, the bond including that oxygen atom may include ether, ester, and urethane bonds. It is here to be noted that even some groups other than that chain hydrocarbon group may have film-formation capability, but most of the film-formation capability of tannic acid is still unknown and needs further study.

Materials for Synthesis

The materials: tannic acid (TA), hexamethylene diisocyanate (HDI), butanediol, diethylene glycol (DEG), tetraethylene glycol (TEG), hexaethylene glycol (HEG), 2,2-diphenyl-1-picrylhydrazyl (DPPH), cadmium sulfate, silver nitrate were all purchased from WakoPure Chemical Corporation, and other chemical substances/solvents were done from commercial suppliers.

Ethylene glycol was deaerated or degassed for 30 minutes by vacuum drying before used for the reaction, and the synthesized reagents except ethylene glycol were used in an as-purchased state without being subjected to any treatment such as purification.

(Comparative Example) One-Step Approach

Figure 2A:
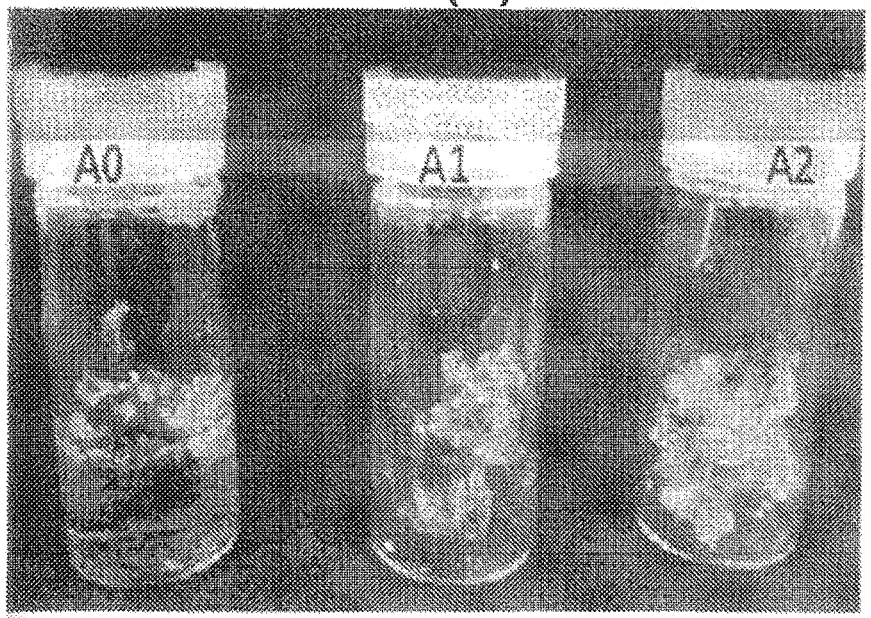
FIG. 2(A) is a photograph taken of the appearance of tannic acid powders added to hexamethylene diisocyanate.
Figure 2B:
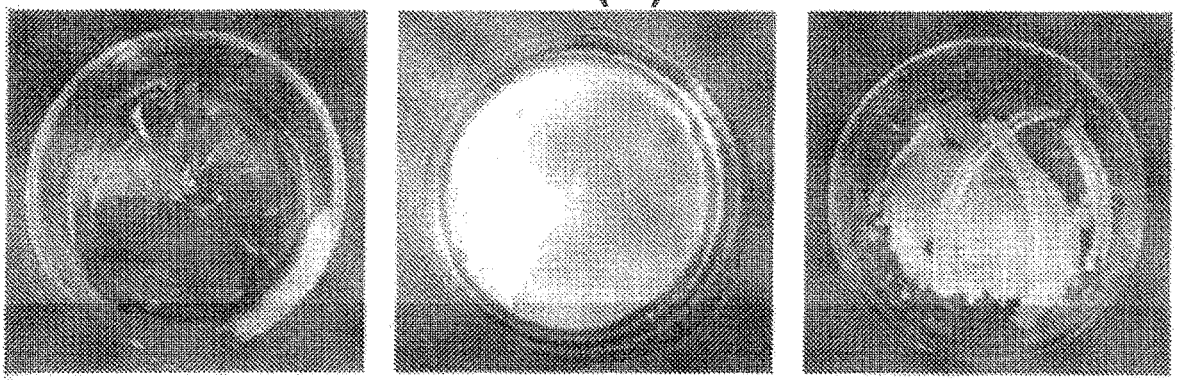
FIG. 2(B) is a photograph taken of a film tentatively obtained by way of the reaction process of FIG. 1(A).

FIG. 1 is a chemical reaction process diagram illustrative of a comparative example of the invention in which tannic acid is synthesized in one step without recourse to any precursor polymer. FIG. 2(A) is a photograph taken of the appearance of tannic acid powders upon added to hexamethylene diisocyanate and FIG. 2(B) is a set of photographs taken of the appearance of a film tentatively obtained by the reaction process of FIG. 1.

Three solutions of tannic acid (TA) in dehydrated tetrahydrofuran (THF) (0.94 gram, 0.765 gram and 0.65 gram) were prepared in a vial (20% w/v). Varying amounts (7 μl, 13 μl and 25 μl) of hexamethylene diisocyanate were added to the three tannic acid (TA) solutions at room temperature. The resulting mixture was stirred and placed on a Petri dish. Table 1 is indicative of the properties of the film compositions obtained by the one-step approach. In the one-step approach, any film composition did not occur or, even if formed, the ensuring film could not be estimated as a film composition because of being brittle.

TABLE 1

| | One-Step Approach | | |
|---|---|---|---|
| Sample Name | NCO/OH (HD1/TA) | Tannic Acid (% by mass) | Results of Appearance Observation |
| A0 | 5/95 | 94 | No film formed |
| A1 | 20/80 | 76.5 | Brittle film formed |
| A2 | 35/65 | 65 | No film formed |

EXAMPLES

Two-Step Approach

Figure 3:
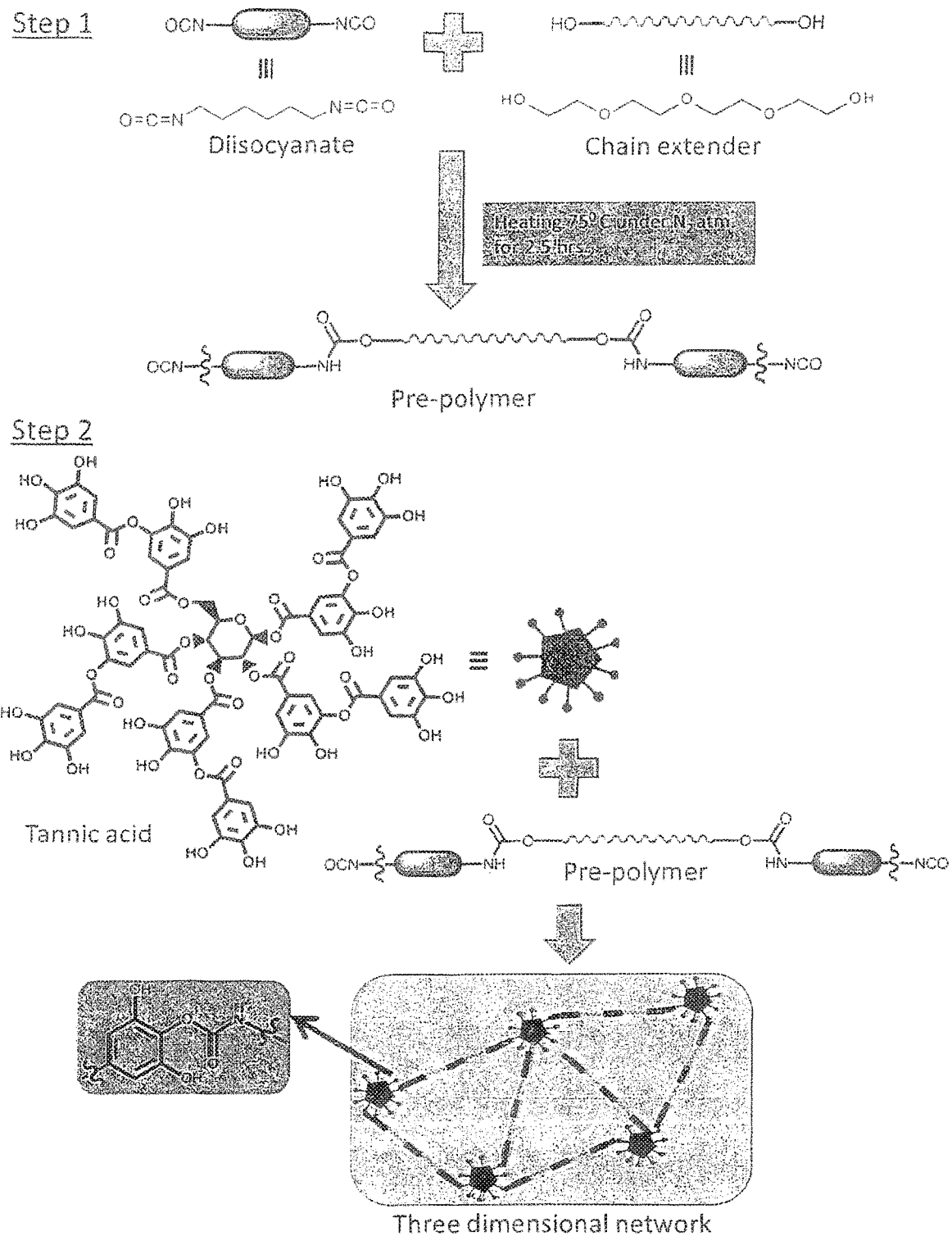
FIG. 3 is a chemical reaction process diagram illustrative of an example of the invention, wherein tannic acid is synthesized in two steps making use of the precursor polymer.

FIG. 3 is a chemical reaction process diagram illustrative of an example of the invention in which tannic acid is synthesized in two steps by way of the precursor polymer.

In this example, tetraethylene glycol (TEG) (1 mmol) was collected in a two-neck round-flask equipped with a water cooler, and dried under a high vacuum for 30 minutes, after which the reaction vessel was purged with argon. Hexamethylene diisocyanate (2 mmol) was added to the reaction vessel. This reaction vessel was heated in an oil bath of 75° C. for 2.5 hours while stirring was carried out at a constant 300 rpm using a stirrer chip. Then, the reaction mixture was added to a solution of tannic acid in dehydrated THF (20% w/v) with no application of any cooling, but this was found to have the same composition (NCO/OH-20/80) as Sample A1 prepared by the aforesaid one-step approach. The resulting mixture was uniformly spread over a Petri dish.

Referring to one specific synthesis procedure, the film composition was uniformly placed over a Petri dish of 3 cm or 10 cm in diameter. The amount of spreading was 25 mg/cm$^2$. Then, an aluminum foil having a small through-hole enabling the solvent to escape out was covered over the Petri dish, and drying was carried out at room temperature for 2 hours, after which the Petri dish was held in an oven at 50° C. for one hour, and then at 75° C. for 30 minutes. Finally, the dish was slowly cooled down to room temperature.

Optimization of the Composition

Figure 4:
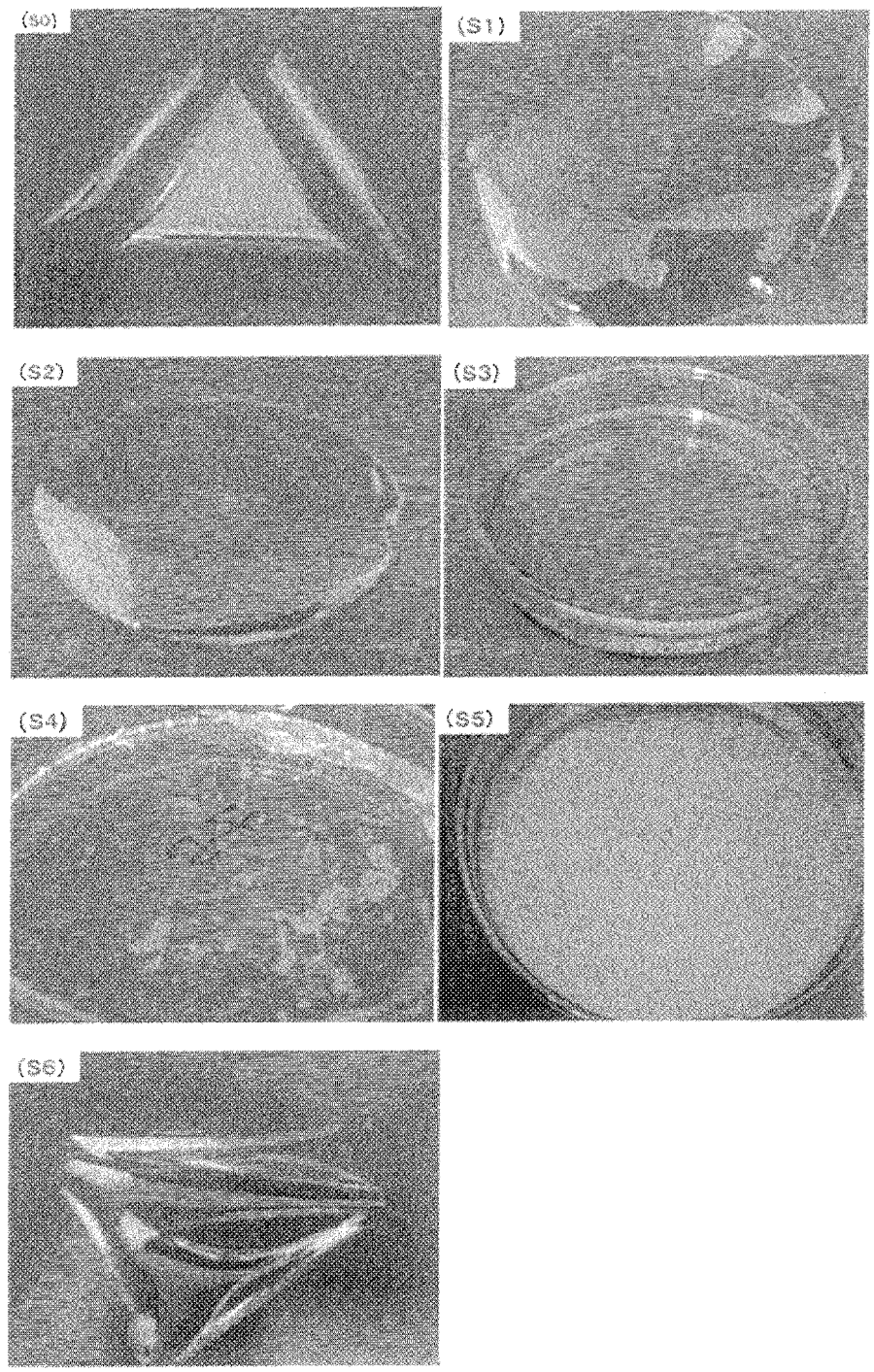
FIG. 4 is a set of photographs taken of a film tentatively obtained by way of the reaction process of FIG. 3, showing various ratios of isocyanate groups to hydroxyl groups of tannic acid for comparison purposes.

FIG. 4 is a set of photographs taken of the appearances of the films tentatively obtained by the reaction process of FIG. 3 with various ratios of the isocyanate groups to the hydroxyl groups in tannic acid given for comparative purposes. Table 2 is indicative of the properties of seven film compositions S0 to S6 obtained by the two-step approach.

"Diisocyanate" in Table 2,3 means the linear precursor polymer that has isocyanate groups at its two ends.

In the original step, the weight percentages of TA were varied such that the molar ratio of NCO/OH was maintained equal to 2. Then, different NCO/OHs were tried in the original step while the amount of tannic acid TA was maintained at 60% by mass. By maintaining the molar ratio of hydroxyl groups OH(TA) in tannic acid TA at 80 to 85 and the NCO/OH (HDI/TEG) equal to 2, it was found that the best film could be produced.

TABLE 2

| Compositions | NCO/OH (diisocyanate/Ta-eq.) | NCO/OH (pre-polymer) (moles) | Tannic Acid (% by mass) | Results of Appearance Observation |
|---|---|---|---|---|
| S0 | 28/72 | 2 | 40 | Brittle film formed |
| S1 | 20/80 | 2 | 50 | Good film formed |
| S2 | 15/85 | 2 | 60 | Good film formed |
| S3 | 10/90 | 2 | 70 | Film was hardly peeled |
| S4 | 6/94 | 2 | 80 | No film formed |
| S5 | 9/91 | 1.5 | 60 | Film was hardly peeled |
| S6 | 18/82 | 2.5 | 60 | Brittle film formed |

Figure 5:
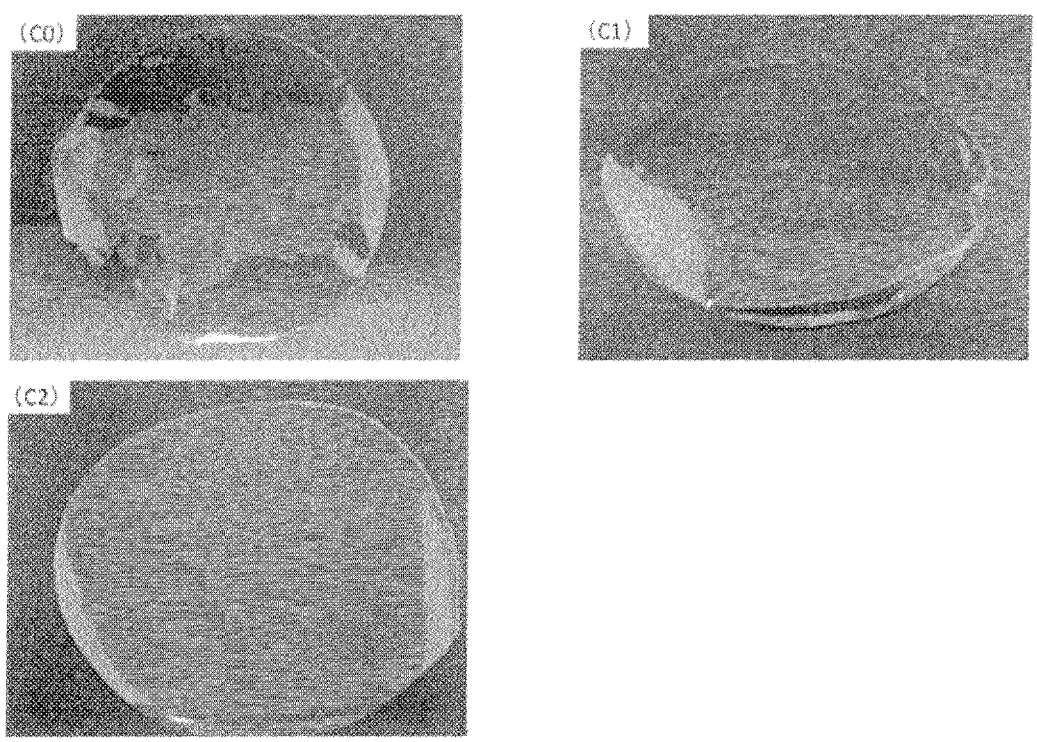
FIG. 5 is a set of photographs taken of a film tentatively obtained by way of the reaction process of FIG. 3, showing various chain extensions in the precursor polymer for comparison purposes.

FIG. 5 is a set of photographs taken of the appearances of films tentatively obtained by the reaction process of FIG. 3, in which various chain extensions in the precursor polymer are compared. Table 3 is indicative of the constitutions of the film compositions using various chain extensions. Three compositions: C0 including diethylene glycol (DEG), C1 including tetraethylene glycol (TEG) and C2 including butanediol are given. With DEG and TEG used as the chain extension, there was a good film formed, but with butanediol, there was a brittle film formed.

TABLE 3

| Compositions | NCO/OH (diisocyanate/Ta-eq.) | NCO/OH (pre-polymer) (moles) | Tannic Acid (% by mass) | Chain extensions | Results of Appearance Observation |
|---|---|---|---|---|---|
| C0 | 17/83 | 2 | 60 | DEG | Good film formed |
| C1 | 13/87 | 2 | 60 | TEG | Good film formed |
| C2 | 18/82 | 2 | 60 | Butanediol | Brittle film formed |

FT-IR (Fourier Transform Infrared Spectroscopy)

For the films, FT-IR was carried out in the attenuated total-reflection mode (ART). For the precursor polymer and tannic acid, FT-IR was practiced in the transmission mode using a potassium bromide (KBr) tablet with the aid of an XYZ table having a spectral range of 525 to 4000 cm$^{-1}$ and a resolving power of 4 cm$^{-1}$ (Thermo Fisher Scientific Inc.).

Figure 6:
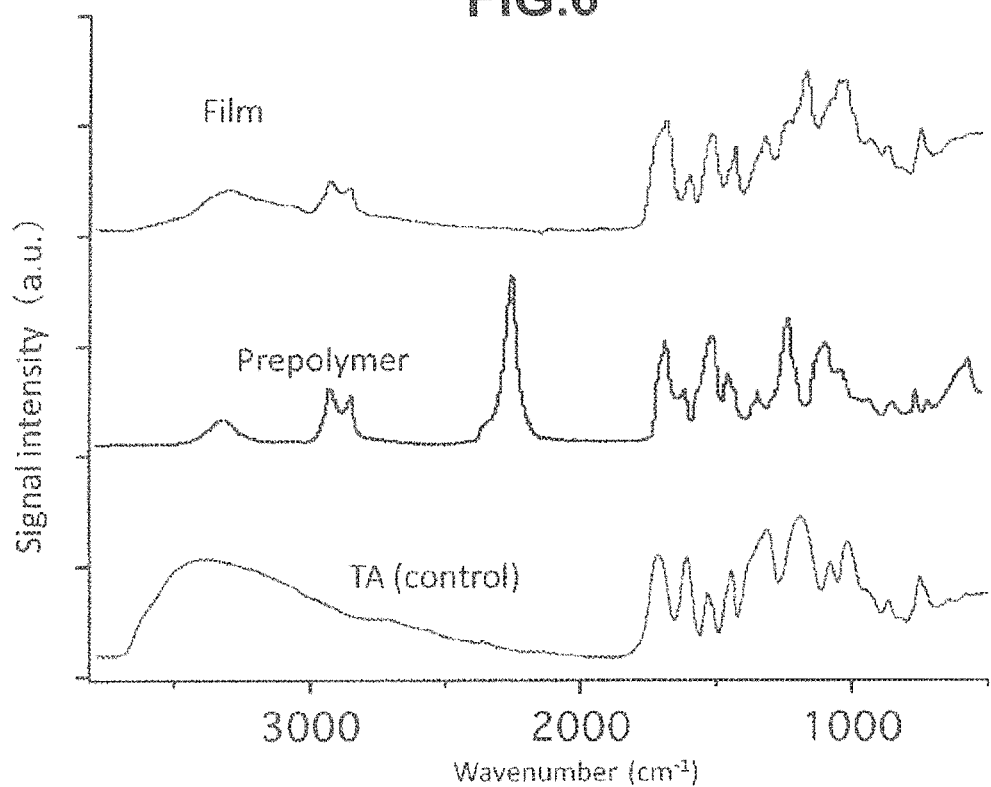
FIG. 6 is indicative of the FTIR spectra of a film composition prepared as one example of the invention.

FIG. 6 is indicative of the FT-IR spectra of a film composition (S1) prepared as one example of the invention. Tannic acid TA shows a wide band between 3600 cm-1 and 3000 cm$^{-1}$ indicating the O—H stretching of polyphenol. Another peak at 1650 cm$^{-1}$, 1532 cm$^{-1}$, and 1444 cm$^{-1}$ is characteristic of the stretching of interatomic bonds of an aromatic compound. The precursor polymer has a characteristic peak of N—H of 3294 cm$^{-1}$ and a characteristic peak of C—N of 1600 cm$^{-1}$, which indicate the formation of urethane in the precursor polymer. The precursor polymer also has a peak of the isocyanate group at 2260 cm$^{-1}$, but it has been found that any free isocyanate groups are not present in the spectra of the film because all free isocyanate groups present in the precursor polymer has reacted with the hydroxyl group moieties of tannic acid.

Mechanical Properties

According to ASTM D882, tensile testing was carried out at a strain rate of 0.1 mm/min. using a universal testing machine (UTM, Model AF-X) available from Shimadzu Corporation. The sample was maintained at a width of 10 mm and a thickness of 0.2 mm, respectively. The film thickness was measured with a Mitsutoyo digital film thickness meter. The dynamic viscoelasticity was measured while frequency sweep was applied using RSA-G2 available from TA Instrument. To the geometrical conditions, a spring mode having an axial force of 500 grams and a 0.1% strain was applied.

Figure 7A:
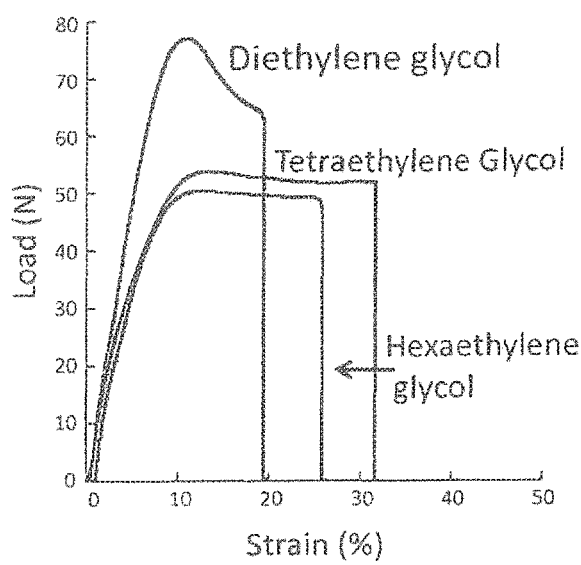
FIG. 7 is a set of graphs indicative of the results of tensile tests (A) and (B) and the results of measurement of dynamic viscoelasticity of a film composition prepared as one example of the invention.
Figure 7B:
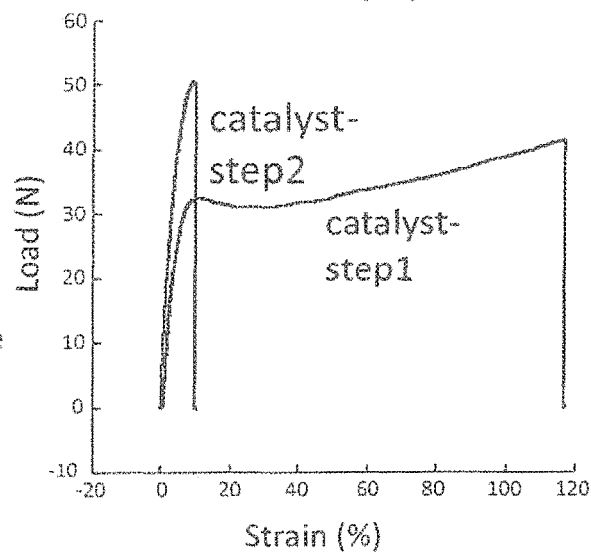
Figure 7C:
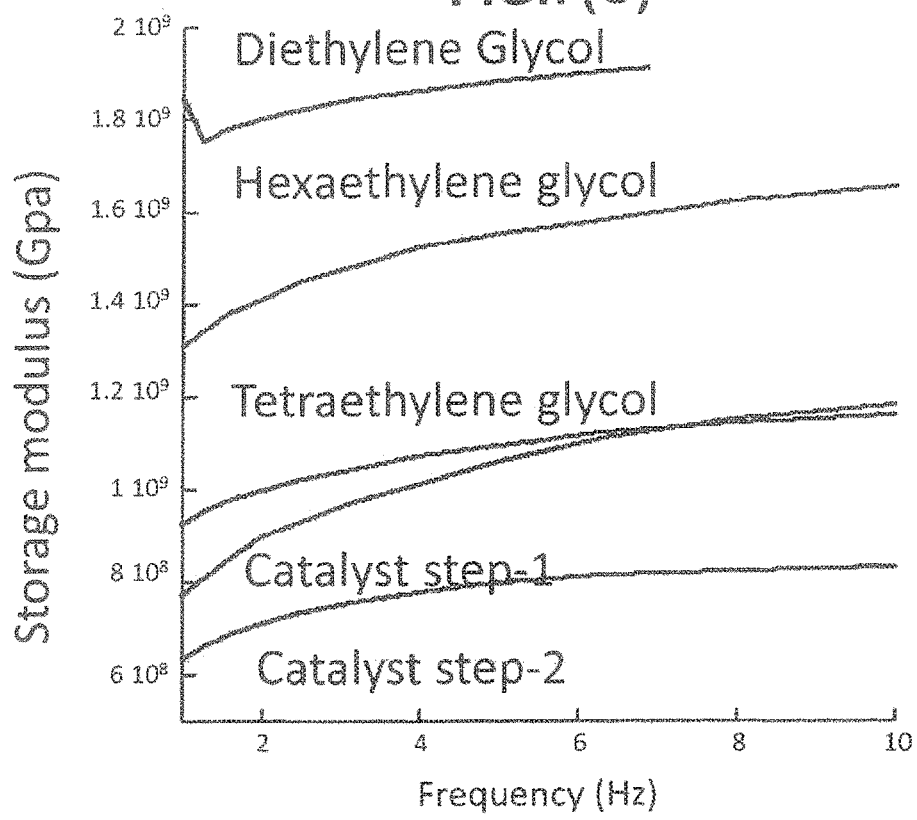

FIGS. 7(A) and 7(B) are graphs indicative of the results of tensile testing of a film composition prepared as one example of the invention, and FIG. 7(C) is a graph indicative of the results of measurement of the dynamic viscoelasticity of that film. Shown in Table 4 are the tensile strengths, strains and Young's moduli of various film compositions.

It is here to be noted that Diethylene Glycol, Tetraethylene Glycol, and Hexaethylene Glycol in FIGS. 7(A), 7(C) and Table 4 stand for films prepared according to the aforesaid two-step approach with diethylene glycol (DEG), tetraethylene glycol (TEG) and hexaethylene glycol (HEG) as the chain extensions.

Catalyst-Step 1 is a film prepared by the addition as a catalyst of 1% by volume of dioctyl tin dilaurate in the first step of the two-step approach, and Catalyst-Step 2 is a film prepared by the addition as a catalyst of 1% by volume of dioctyl tin dilaurate in the second step of the two-step approach. The chain extension is hexa-ethylene glycol in both Catalyst-Step 1 and Catalyst-Step 2.

TABLE 4

| Sample Materials | Tensile Strength (MPa) | Strain (%) | Young's Modulus (MPa) |
|---|---|---|---|
| Diethylene glycol | 38.45 | 19.7 | 558.12 |
| Tetraethylene glycol | 26.82 | 31.75 | 410.50 |
| Hexaethylene glycol | 25.14 | 26.25 | 389.47 |

Thermal Properties TGA

For thermogravimetric analysis (TGA), TG/DTA6200 available from SII (Seiko Instrument Inc.) was used. An aluminum pan was used for tannic acid TA and the precursor polymer, and a platinum pan was used as a sample holder for film samples. Alumina ($Al_2O_3$) powders were used for control purposes in every case. The heating rate was maintained at 10° C./minute. The tannic acid TA and precursor polymer were heated up to 500° C. while the film sample was heated up to 700° C.

Figure 8:
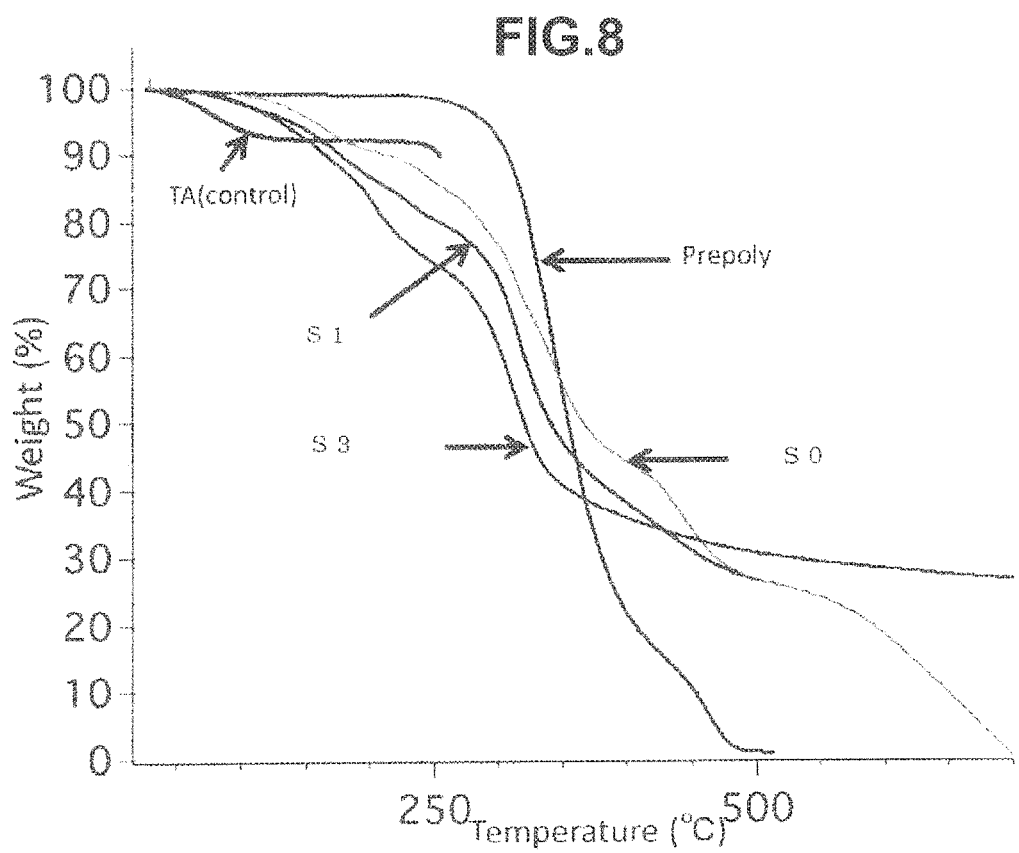
FIG. 8 is a graph indicative of the results of thermogravimetric analysis of a film composition prepared as one example of the invention.

FIG. 8 is a graph indicative of the results of thermogravimetric analysis of a film composition prepared as one example of the invention. Tannic acid (TA) starts to degrade or decompose thermally at 65° C., and breaks down completely around 250° C. The precursor polymer started to degrade around 300° C., and was broken down completely at about 500° C.

The thermograms of tannic acid TA resin films (S0, S1 and S3) showed two degradation steps. The film showed a weight loss of 20 to 30% by weight from a temperature of 150 to 250° C. due to unreacted TA molecules in the film. In other words, this happens by way of thermal hydrolysis of tannic acid TA breaking down into gallic acid and pyrogallol. This has been made sure by the fact that in a sample containing more tannic acid TA, there was a larger weight loss occurring in the first degradation step.

Around or higher than 300° C., there was a sharp weight loss found, and around 450° C., about 60% was lost, after which the weight of the sample was slowly down to about 20% upon the temperature reaching 700° C. There was no significant difference between the thermograms of films including different chain extensions. From this result it might be presumed that the film samples may be used at temperatures up to 150° C., but it is not suited for high-temperature applications.

Water Resistance

Figures 9A, 9B:
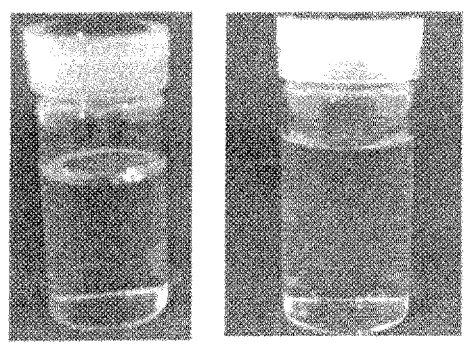
FIG. 9 is a graph indicative of the water resistance of a film composition prepared as one example of the invention with (A) indicating tannic acid in glass bottle, (B) indicating a film in glass bottle, (C) indicating weight changes due to water absorption, and (D) indicating the angles of contact.
Figure 9C:
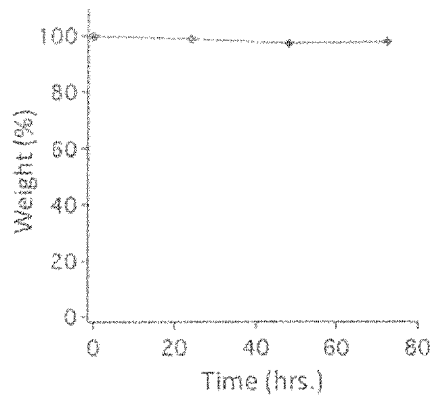
Figure 9D:
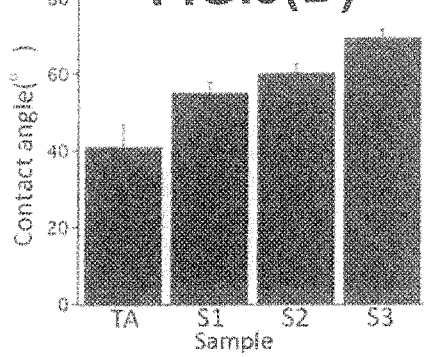

FIGS. 9(A), 9(B), 9(C) and 9(D) are a set of graphs indicative of the water resistance of film compositions (S1, S2 and S3) prepared as one example of the invention with FIG. 9(A) being indicative of tannic acid in glass bottle, FIG. 9(B) of a film in glass bottle, FIG. 9(C) of weight changes due to water absorption, and FIG. 9(D) of an angle of contact.

To make sure damages to films due to water absorption and water, a film was cut into 1×1 cm² sample pieces which were then immersed in a water-containing vial and measured for their weight at a plurality of varying time intervals. The films' hydrophobicity was studied by the measurement of angles of contact at 298K using Dropmaster 300 model available from Gecco INC. The angles of contact given in FIG. 9(D) are an average of five or six measurements.

Tannic acid becomes hydrophilic depending on the number of hydroxyl groups, and is well capable of dissolution in water. However, damages caused by water and adsorption of water are not preferable for applications where self-supporting films are used. The films prepared herein show good water resistance, and remain stable even after 7-day immersion in water. The inventive film formed of resin has a contact angle of 55 degrees or more with water, whereas a contact angle with water of a film composed only of tannic acid is as low as 40 degrees.

Scanning Electron Microscope (SEM) & Interatomic Force Microscope (AFM)

SU4800/8000 available from Hitachi was used for the SEM. In every case, samples were coated with platinum (Pt) for 30 seconds. A Nanonavi instrument available from Seiko Instrument Inc. was used for AFM observations.

FIG. 10(A) is a (10-μm scale) SEM photograph taken of a film composition (S1) prepared as one example of the invention, and FIG. 10(B) is a (500-nm scale) interatomic force microscope (AFM) photograph taken of that film composition. The resin has a very uniform and homogeneous morphology. The uniform three-dimensional network is formed of a tannic acid portion bonded by way of the precursor polymer chains, completely free from any phase separation. This phase separation is observed thanks to the non-interchangeability of hard and soft areas. The film had an average surface roughness of 5 nm.

Antibacterial Testing

FIGS. 11(A) and 11(B) are illustrative of antibacterial testing of a film composition (S1) prepared as one example of the invention.

Antibacterial testing was carried out pursuant to Japanese Industrial Standard JIS 22801 (ISO 22196). The bacteria used herein are colon bacilli, golden staph and *Pseudomonas aeruginosa*. Three test pieces per test, each one being a square small piece having one side of 50 mm, were cut out of the film. Each test piece was washed on its surface with cotton wool immersed in ethanol. Each tannic acid film (50% TA: S1) was placed in a sterile Petri dish, and 0.4 ml of a pre-cultured test seeding material having a bacterial concentration of $2.5 \times 10^5$ to $10 \times 10^5$ CFU/ml was added dropwise to each tannic acid film. A polystyrene film was covered over the seeded tannic acid film, which was then cultured or incubated for 24 hours. After the elapse of 24 hours, the test bacteria were washed with 10 ml of a SCDPL culture solution (in which 17.0 grams of casein protein, 3.0 grams of soy bean peptone, 5.0 grams of sodium chloride, 2.5 grams of disodium hydrogen phosphate, 2.5 grams of glucose and 1.0 gram of lecithin were contained in 1000 ml of purified water), and viable bacteria were counted by the agar plate-culture method. Control testing was carried out in the absence of any film.

Table 5 is indicative of the results of antibacterial testing of the film compositions with colon bacilli, golden staph and *Pseudomonas aeruginosa*. The film compositions prepared as one example of the invention provide a better antibacterial activity to any bacteria over the control testing.

TABLE 5

| | Number of Viable Bacteria ($10^5$ cfu/mL) | | | |
|---|---|---|---|---|
| Test Samples | Colon bacilli | Golden staph | *Pseudomonas aeruginosa* | Cycle |
| Control Group | 110 | 1.1 | 20 | First |
| TA film | <10 | <10 | <10 | |
| Control Group | 120 | 1.5 | 15 | Second m |
| TA film | <10 | <10 | <10 | |
| Control Group | 120 | 1.2 | 10 | Third |
| TA film | <10 | <10 | <10 | |

Antioxidant

The antioxidant activity of a film composition (S1) was estimated using a DPPH (2,2-diphenyl-1-picrylhydrazyl) free-radical capturing assay. FIG. 12 is illustrative of how free radicals are captured by DPPH (2,2-diphenyl-1-picrylhydrazyl).

Four film samples, each one having a 1×1 cm² shape were immersed respectively in 2.5 ml of 1 mM methanol solution of DPPH collected in four different vials, and held in the dark. Changes in color were observed, and absorption spectra at 515 nm were measured after the elapse of varying times, using a JASCO (V-670) spectrophotometer. Ultraviolet-visible spectroscopic spectra were obtained at a band width of 5 nm, in a wavelength range of 250 to 600 nm and at a scanning rate of 400 nm/min. The test solutions were all diluted five folds for spectral measurements.

With the elapse of time, there were changes observed in the color of the DPPH solution. That is, the color changed from purple to light yellow after the elapse of 2 hours, indicating the reduction of DPPH. From the results obtained by the ultraviolet-visible spectrophotometer, it has been found that the film has an antioxidant activity. The control solution having no film showed a strong absorption band at 517 nm, indicating that the film-containing solution has a reduced absorption band. The test solution held for 2 hours showed no absorption at 520 nm. The ratio of the free-radical elimination activity of DPPH was determined using the following equation.

DPPH capturing effect %=(Abs control solution−Abs test sample×100)/Abs control solution    Equation Formula 1

TABLE 6

| Time (min.) | Capturing Effect (%) |
|---|---|
| 30 | 74.51 |
| 60 | 86.48 |
| 120 | 97.05 | pH-Dependent Degradation Capability 3N hydrochloric acid (HCl) was used as an acidic medium and 1N NaOH was used for the preparation of a basic medium. A film piece was immersed in six media having different pH values of 2, 4, 7, 8, 10 and 12. The initial and final weights were measured after 24 hours, and ultraviolet-visible spectroscopy was applied to all the solutions.

FIGS. 13(A) and 13(B) are illustrative of the pH-dependent degradation testing of the film composition (S1) prepared as one example of the invention with FIG. 13(A) standing for pH and weight changes and FIG. 13(B) representing ultraviolet-visible spectroscopic spectra.

At pH 12 the solution changed in color and the film turned to black, but any visible change was not observed in other pH media. At pH 12, there was a 12% weight loss observed, but such a weight loss was not found in other media, indicating the leaching of TA out of the film in a highly basic medium.

Figure 14A:
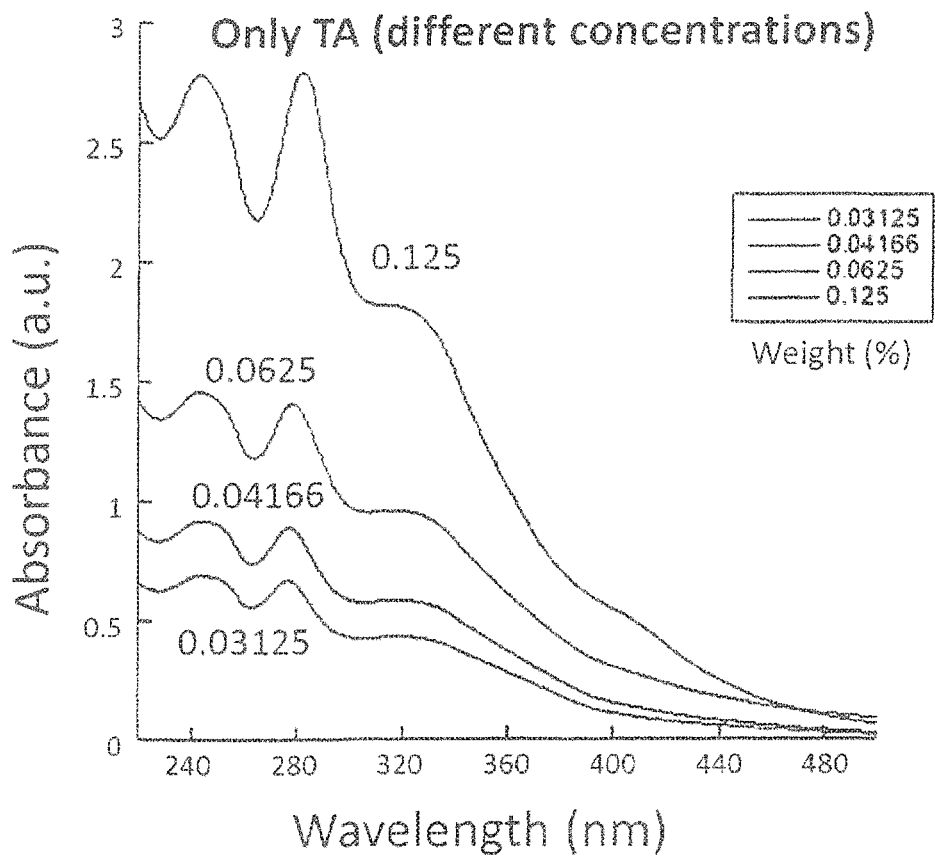
FIG. 14 is illustrative of the pH-dependent degradation test of a tannic acid solution with (A) as ultraviolet-visible spectroscopic spectra and (B) being a microphotograph taken of a tannic acid solution.
Figure 14B:
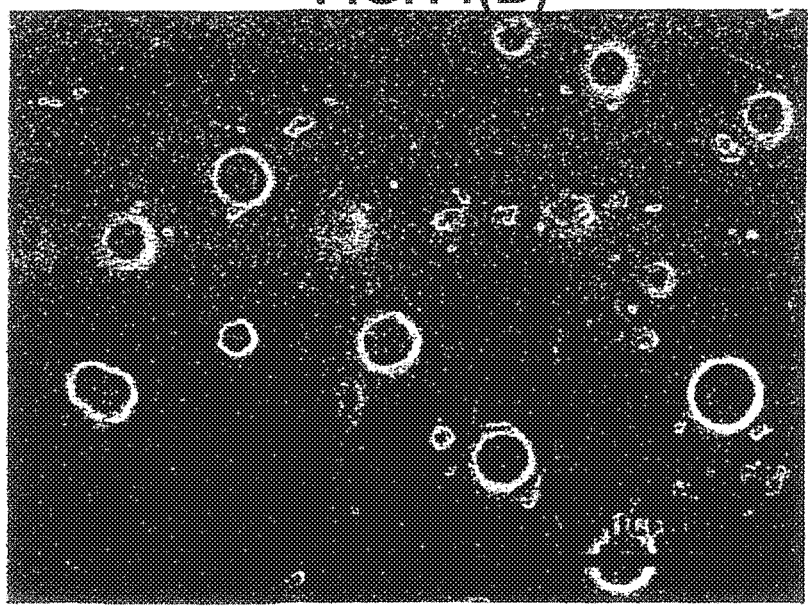

Next, a solution of tannic acid alone in water was subjected to ultraviolet-visible spectroscopic testing. FIGS. 14(A) and 14(B) are illustrative of the pH-dependent degradation testing of a tannic acid solution with FIG. 14(A) standing for ultraviolet-visible spectroscopic spectra at varying tannic acid concentrations and FIG. 14(B) being a microphotograph taken of the tannic acid solution. As the concentration of the tannic acid solution gets high, the quantity of absorption in ultraviolet-visible spectroscopy gets large, but the band of wavelengths absorbed remains constant irrespective of the concentration of tannic acid. The particle diameter of tannic acid is in the range of about 10 to 50 μm.

Figure 15A:
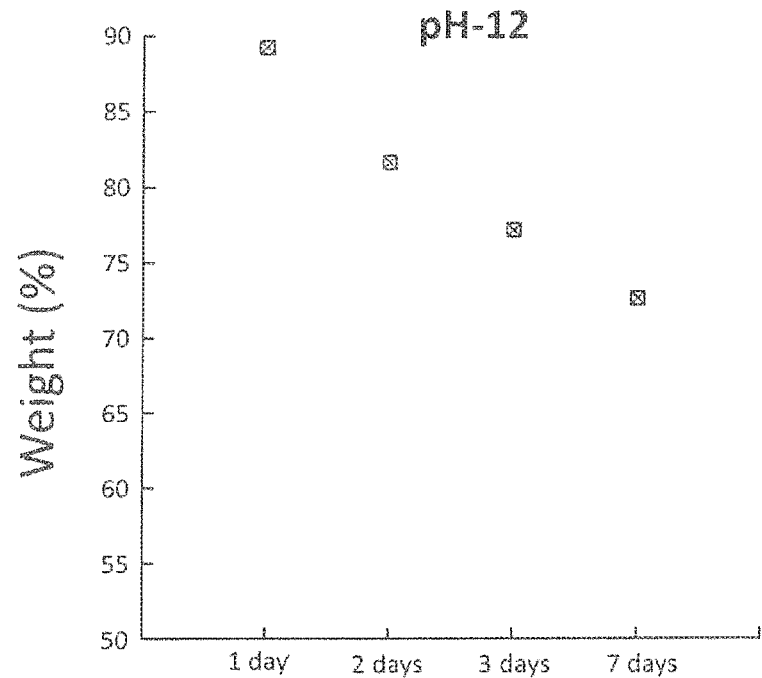
FIG. 15 is illustrative at pH 12 of a film composition prepared as one example of the invention with (A) as weight changes and (B) as ultraviolet-visible spectroscopic spectra.
Figure 15B:
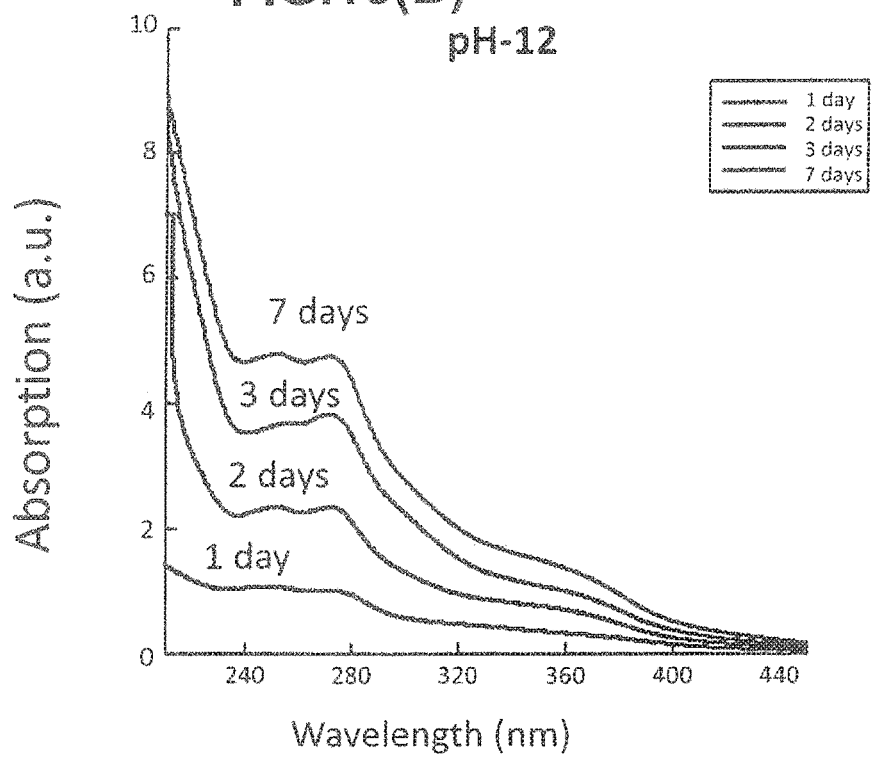

Then, the SEM was applied to a film immersed at pH 12 to make studies of ultraviolet-visible spectroscopy and weight reductions after varying time intervals. FIGS. 15(A) and 15(B) are illustrative at pH 12 of a film composition (S1) prepared as one example of the invention with FIG. 15(A) standing for weight reductions and FIG. 15(B) showing ultraviolet-visible spectroscopic spectra. The film immersed at pH 12 is found to have a first-day weight reduction of −12% and a seventh-day weight reduction of about −28%.

APPLICABILITY TO THE INDUSTRY

The self-supporting film composition of the invention is capable of retaining a film-like shape by itself in the absence of a substrate such as metals or glass and has a bactericidal activity, an antibacterial activity or the like; it is expected to have broad applications.

What is claimed is:

1. A self-supporting film composition consisting essentially of a tannic acid derivative, wherein 12% to 24% of hydroxyl groups in tannic acid are bonded via urethane bonds that are formed by way of reactions with a precursor polymer that has isocyanate groups at two ends of the precursor polymer wherein the tannic acid derivative includes 45 to 65% by mass of the tannic acid and 55 to 35% by mass of the precursor polymer, and the precursor polymer is a reaction product of reaction components consisting of a second linear hydrocarbon compound having hydroxyl groups at two ends of the second linear hydrocarbon compound urethane-bonded at each end of the second linear hydrocarbon compound to a first linear hydrocarbon compound having isocyanate groups at two ends of the first linear hydrocarbon compound.

2. The self-supporting film composition as recited in claim 1, wherein the second linear hydrocarbon compound having hydroxyl groups at two ends is an oligoethylene glycol as a spacer.

3. The self-supporting film composition as recited in claim 1, wherein a ratio of the isocyanate groups contained in the linear precursor polymer to the hydroxyl groups contained in the tannic acid is (12:88) to (24:76) inclusive in terms of molar ratio.

4. The self-supporting film composition as recited in claim 1, wherein the tannic acid takes a form of being dissolved in a solution containing dehydrated tetrahydrofuran.

5. The self-supporting film composition as recited in claim 1, wherein the film composition provides a disinfectant, bactericidal, sterilizing, antibacterial or antioxidant activity.

6. The self-supporting film composition as recited in claim 1, wherein the first linear hydrocarbon compound is a hexamethylene diisocyanate.

7. The self-supporting film composition as recited in claim 2, wherein the first linear hydrocarbon compound having isocyanate groups at two ends is a hexamethylene diisocyanate.

8. The self-supporting film composition as recited in claim 2, wherein a ratio of the isocyanate groups contained in the linear precursor polymer to the hydroxyl groups contained in the tannic acid is (12:88) to (24:76) inclusive in terms of molar ratio.

9. The self-supporting film composition as recited in claim 6, wherein a ratio of the isocyanate groups contained in the linear precursor polymer to the hydroxyl groups contained in the tannic acid is (12:88) to (24:76) inclusive in terms of molar ratio.

* * * * *